(12) United States Patent
Jones

(10) Patent No.: US 10,016,904 B2
(45) Date of Patent: Jul. 10, 2018

(54) GUIDE BLADES FOR OSCILLATING AND RECIPROCATING POWER TOOLS

(71) Applicant: Ralph Scott Jones, Austell, GA (US)

(72) Inventor: Ralph Scott Jones, Austell, GA (US)

(*) Notice: Subject to any disclaimer, the term of this patent is extended or adjusted under 35 U.S.C. 154(b) by 0 days.

(21) Appl. No.: 15/013,865

(22) Filed: Feb. 2, 2016

(65) Prior Publication Data
US 2016/0257010 A1 Sep. 8, 2016

Related U.S. Application Data

(60) Provisional application No. 62/111,193, filed on Feb. 3, 2015.

(51) Int. Cl.
| | |
|---|---|
| B23D 51/10 | (2006.01) |
| B23D 59/00 | (2006.01) |
| B26B 29/06 | (2006.01) |
| B27B 19/00 | (2006.01) |
| B23D 61/00 | (2006.01) |
| B26B 7/00 | (2006.01) |
| B26B 29/00 | (2006.01) |

(52) U.S. Cl.
CPC .............. *B26B 29/06* (2013.01); *B23D 51/10* (2013.01); *B23D 59/00* (2013.01); *B23D 61/006* (2013.01); *B26B 7/00* (2013.01); *B26B 29/00* (2013.01); *B27B 19/006* (2013.01)

(58) Field of Classification Search
CPC ........... B26B 7/00; B26B 9/06; B23D 61/006; B23D 51/10; B23D 59/00
USPC ........................ 30/392–394, 223, 346.6, 346
See application file for complete search history.

(56) References Cited

U.S. PATENT DOCUMENTS

| | | | | |
|---|---|---|---|---|
| 3,706,474 A | * | 12/1972 | Neuenburg | B23D 57/0076 173/110 |
| 4,513,742 A | * | 4/1985 | Arnegger | B23D 61/006 30/350 |
| 4,989,320 A | * | 2/1991 | Borkott | B23D 35/008 30/162 |
| 5,309,805 A | * | 5/1994 | Mezger | B25B 27/0092 30/169 |
| 8,915,499 B2 | * | 12/2014 | Kaye, Jr. | B25F 3/00 279/141 |
| D741,135 S | * | 10/2015 | Yang | D15/140 |
| D741,137 S | * | 10/2015 | Yang | D8/70 |

(Continued)

*Primary Examiner* — Andrea Wellington
*Assistant Examiner* — Fernando Ayala
(74) *Attorney, Agent, or Firm* — Jones IP Law, LLC; Dennis W. Jones

(57) ABSTRACT

Guide blades for use with oscillating and reciprocating power tools and provide improved speed and safety, as well as protection against the cutting blades protruding outside of a desired area or beyond a specified surface depth are disclosed. The guide blades include a blade portion with a cutting edge, an adapter corresponding to a particular type oscillating power tool, an attachment base for attaching the guide blade to the oscillating power tool, the attachment base including an offset portion for attachment of the blade portion to the attachment base, and an accessory attachment portion with an opening for securing the adapter to the attachment base, and a rounded guide affixed to the blade portion between the cutting edge and the offset portion, the rounded guide extending from side-to-side and curved away from the offset portion and toward the cutting edge, wherein the rounded guide provides for variable cutting depth.

20 Claims, 12 Drawing Sheets

(56) References Cited

U.S. PATENT DOCUMENTS

2014/0230626 A1\* 8/2014 Puzio ................... B26D 7/2628
  83/697
2015/0000143 A1   1/2015 Bozic
2015/0273706 A1  10/2015 Martin
2016/0082605 A1\* 3/2016 Marks ....................... B26B 7/00
  30/355

\* cited by examiner

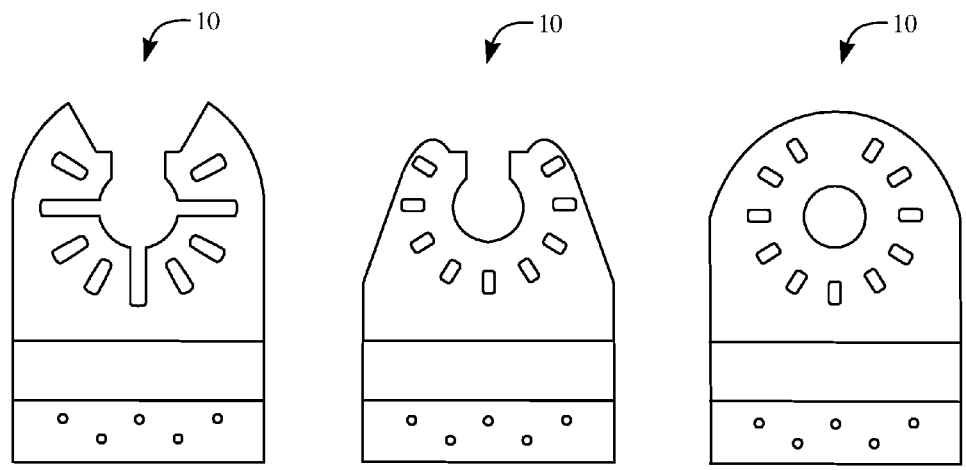
Fig. 1-A
Prior Art
Fig. 1-B
Prior Art
Fig. 1-C
Prior Art
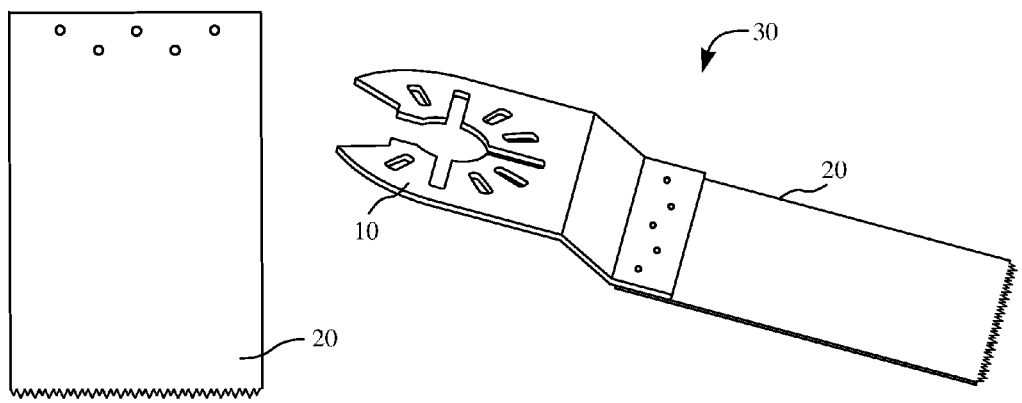
Fig. 2  Prior Art
Fig. 3  Prior Art

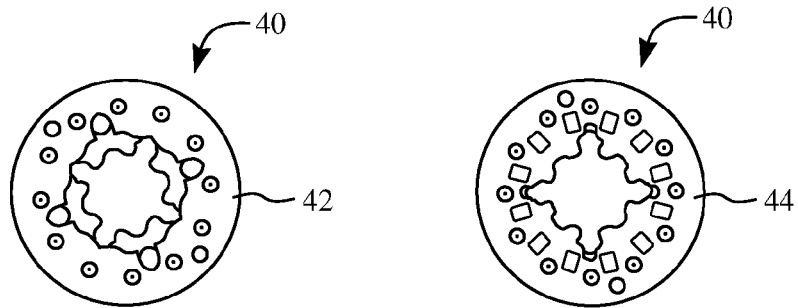
Fig. 4-A
Prior Art
Fig. 4-B
Prior Art
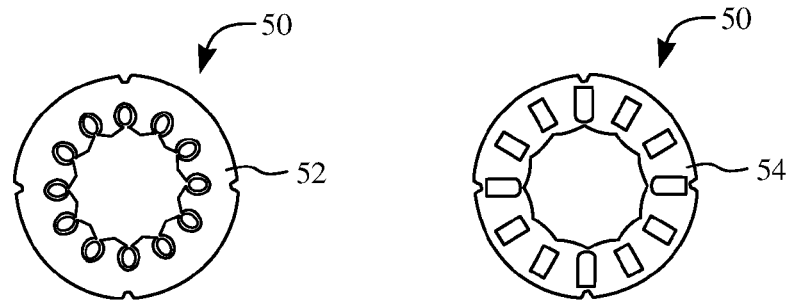
Fig. 5-A
Prior Art
Fig. 5-B
Prior Art
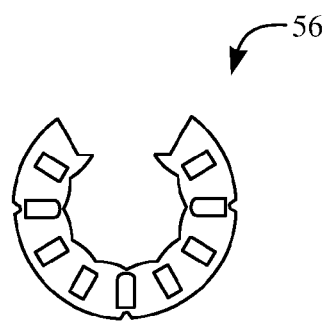
Fig. 6

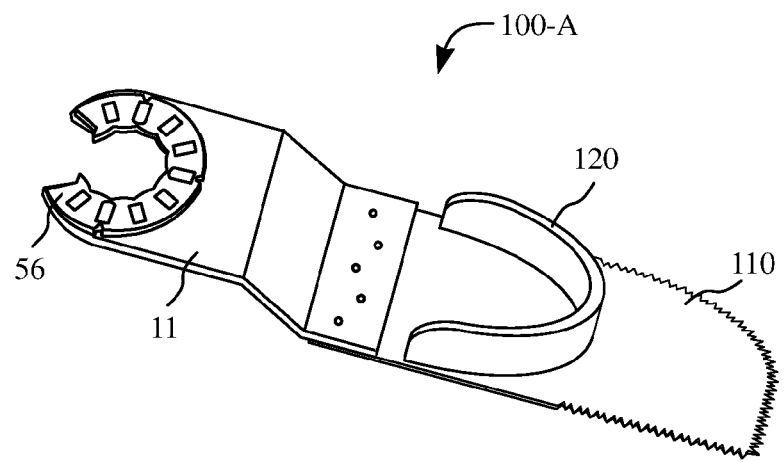
Fig. 7-A
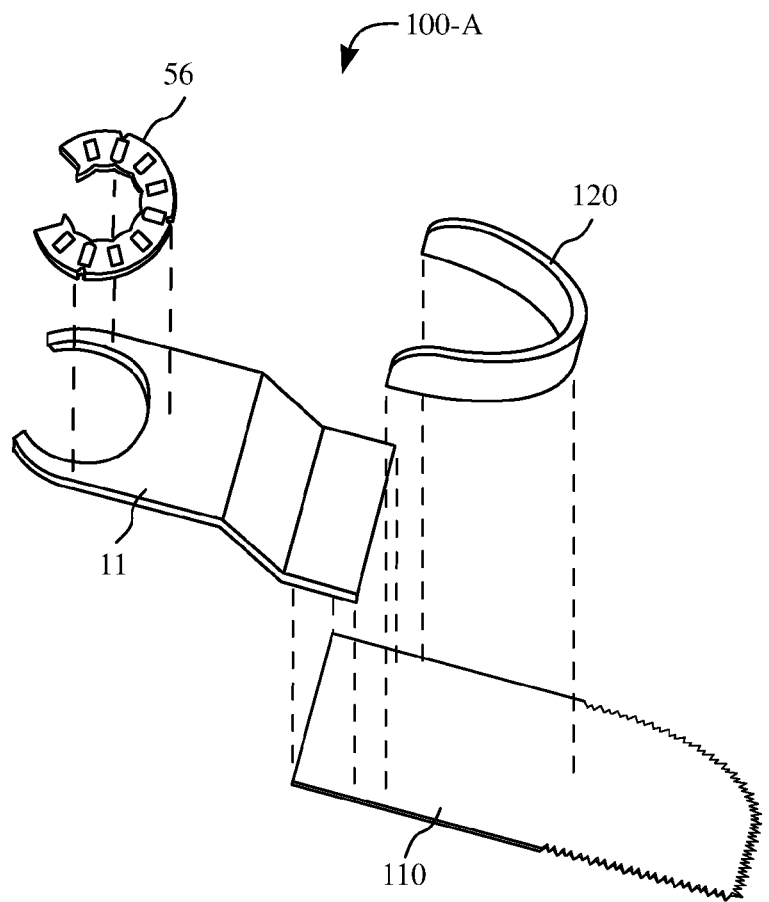
Fig. 7-B

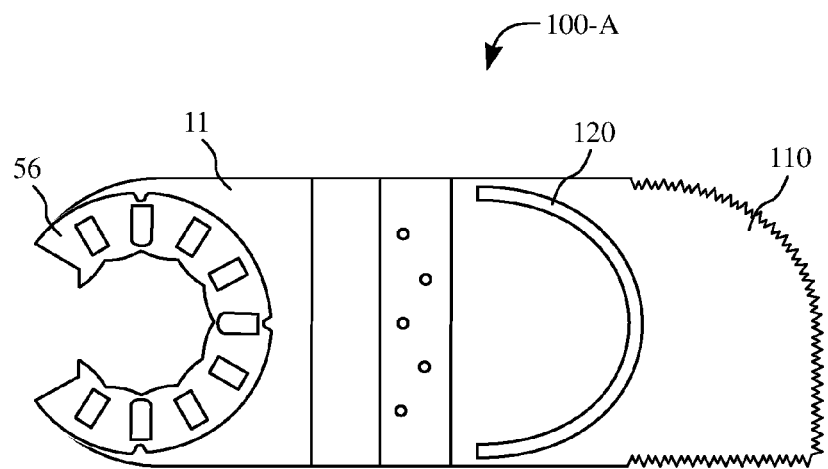
Fig. 7-C
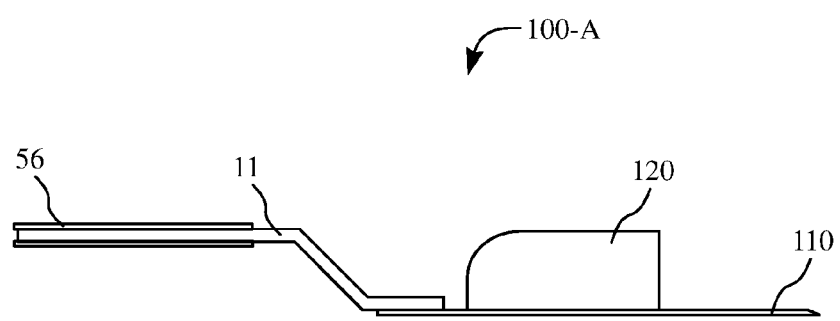
Fig. 7-D

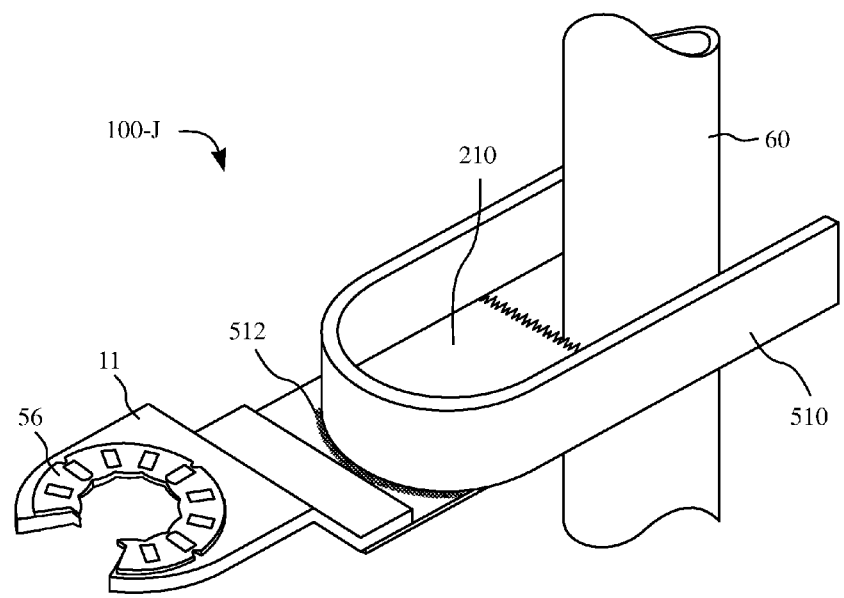
Fig. 16-A
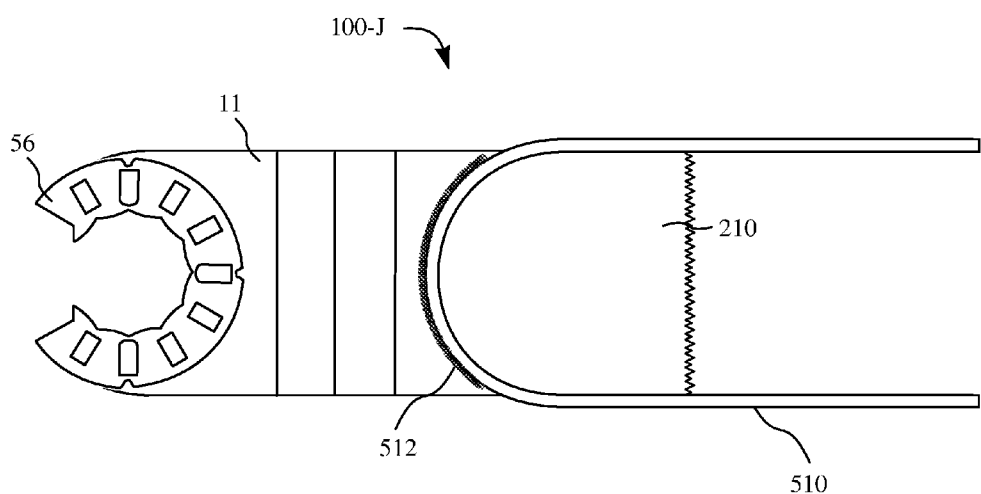
Fig. 16-B

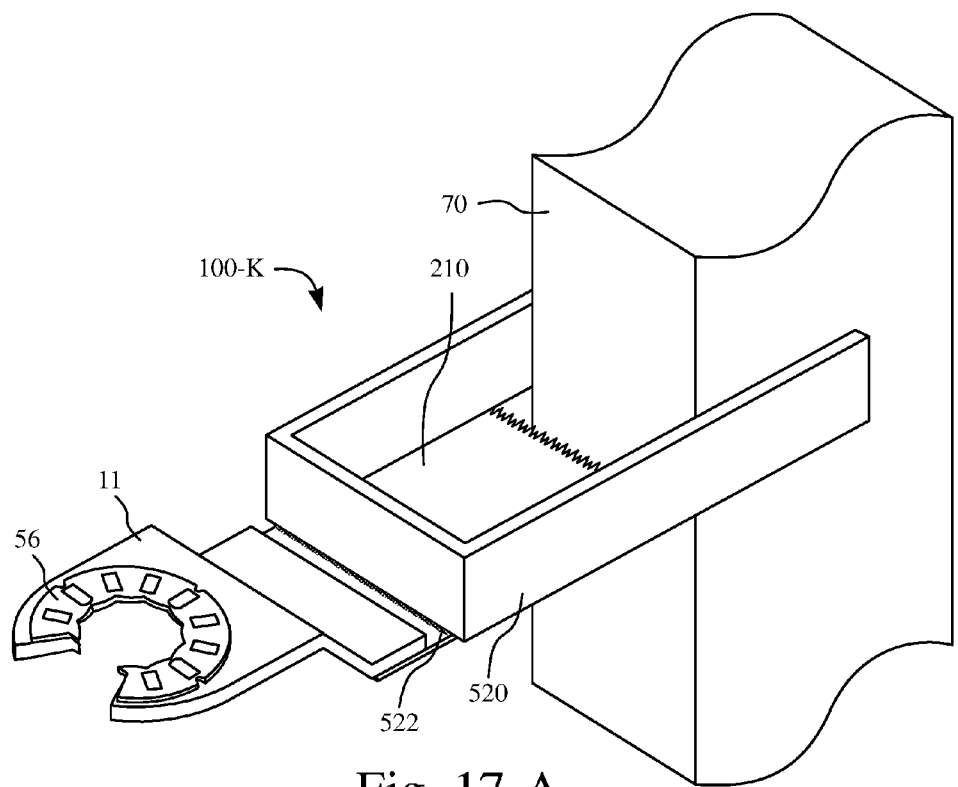
Fig. 17-A
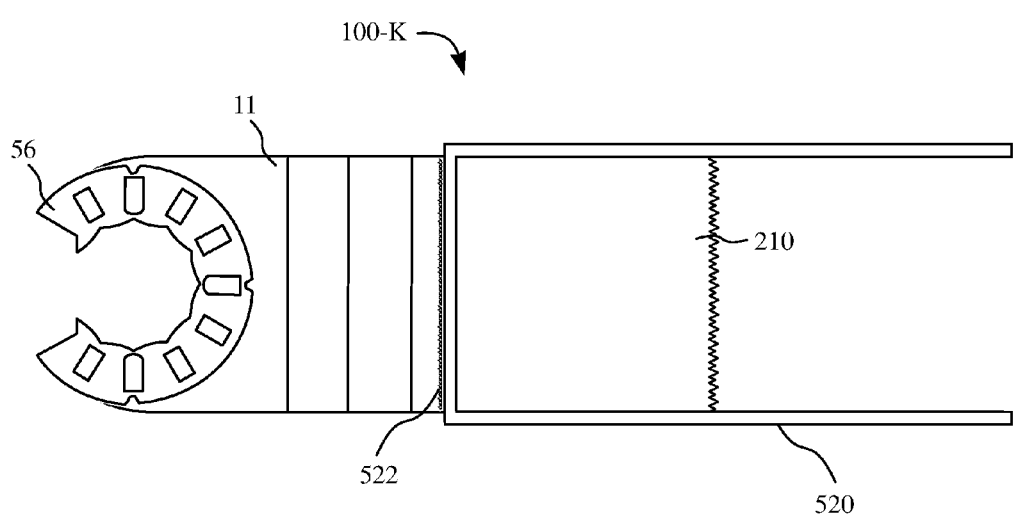
Fig. 17-B

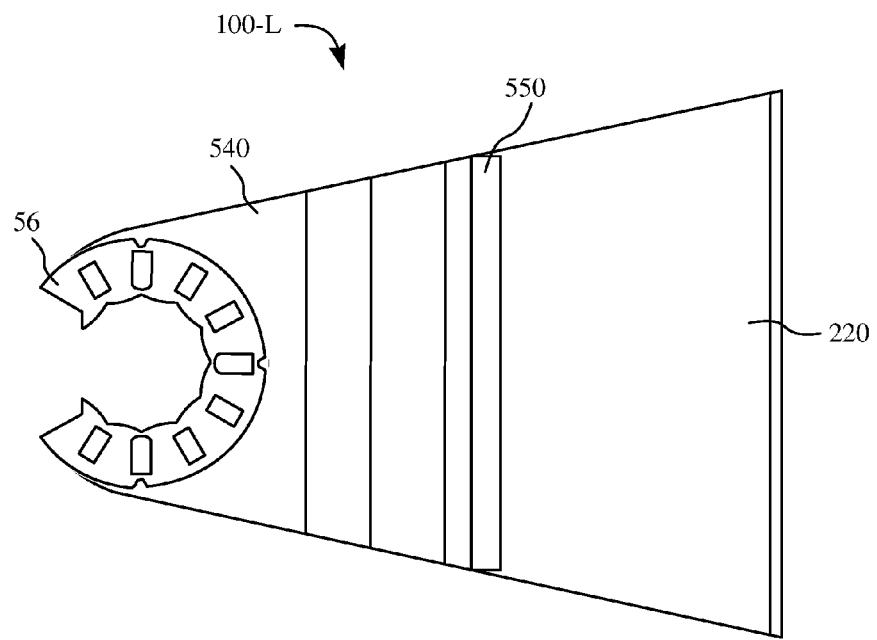
Fig. 18-A
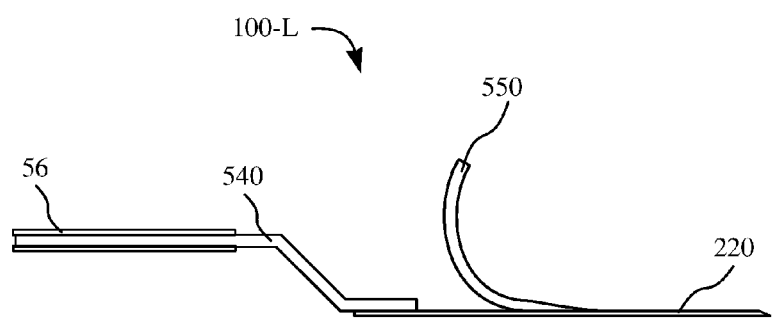
Fig. 18-B

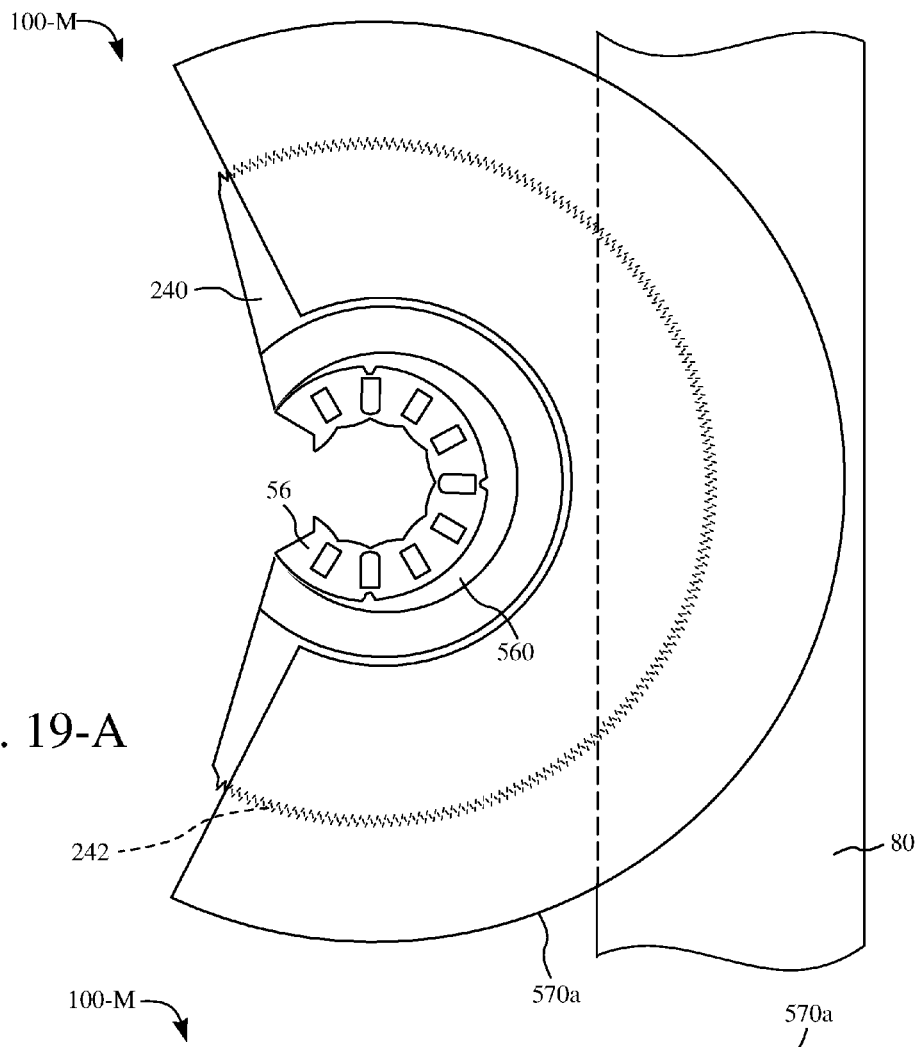
Fig. 19-A
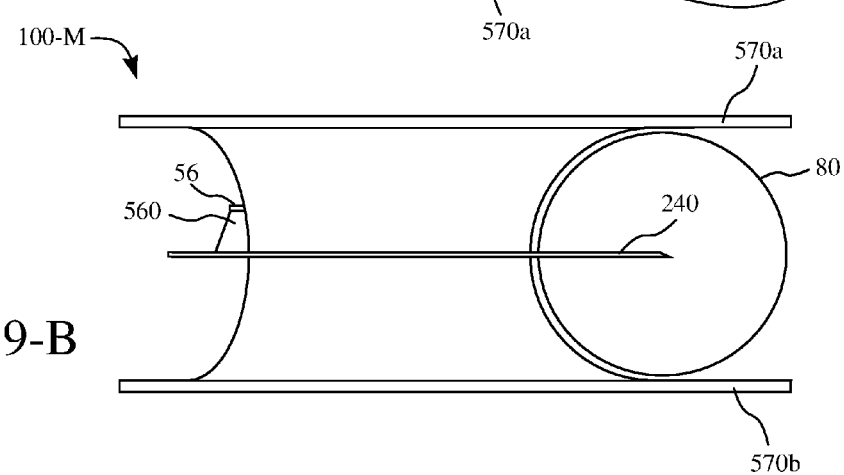
Fig. 19-B

GUIDE BLADES FOR OSCILLATING AND RECIPROCATING POWER TOOLS

CROSS-REFERENCE TO RELATED APPLICATIONS

This application claims the benefit of U.S. Provisional Application No. 62/111,193, entitled "Guide Blades for Oscillating and Reciprocating Power Tools," filed Feb. 3, 2015, which is incorporated herein by reference as if set forth herein in its entirety.

BACKGROUND

This disclosure pertains to blades for use with large and small oscillating and reciprocating power tools and related devices. More particularly, blade guides that improve speed and safety while providing protection against cutting blades and the like protruding outside of a desired area or beyond a specified surface depth are provided.

Oscillating power tools allow for the use of a range of attachments to saw, sand, rasp, grind, scrape, cut, and/or polish. The fitted blades include an offset that allows for cutting or accessing flush with a surface. Oscillating power tools, also called multi-tools, have a small form and the blades can be mounted in virtually any orientation allowing for cutting in areas that were often previously unreachable. Complex and precise cuts can be made without the need for removing the work piece from where it is located. The productivity increase is significant.

A blade or other accessory is attached to the tool by varying mechanisms that provide for oscillation or rapid rotation back and forth. The back and forth motion creates rapid cutting motions utilizing the blade attachments. Since the angle of oscillation is narrow there is no kick as with rotating tools, and the narrow angle provides for precise control of the multi-tool and of the action being taken.

Oscillating power tools utilize cutting blades that are standard saw blades of various type tooth configurations according to the type material to be cut. Straight blades have the teeth at the end of the blade and allow for cutting directly into the material. Bi-metal blades include smaller hardened teeth for cutting soft metals. Japan tooth blades utilize large teeth for cutting wood quickly, though they cannot cut metal. Oscillating power tools also provide for sanding and grinding operations that can be useful for cleaning as well as polishing or smoothing.

An arbor attachment is utilized for attaching a tool attachment portion to the oscillating power tool. Arbor attachments have varied widely and often utilize a proprietary arbor configuration. Universal arbor attachments have been developed to be compatible with many of these proprietary configurations.

Another type of saw is a reciprocating saw, and achieves the cutting action through a push and pull reciprocating motion of the blade. Reciprocating saws are commonly used in construction and demolition work. A reciprocating saw includes a large blade resembling a jigsaw type blade.

Oscillating power tools are useful for repairs where a cut is required in surfaces that may have electrical wires, water pipes, vents, and such like behind the surface. However, it is also very easy to cut into those wires, pipes, and the like by cutting too deep into the area being cut. What is needed is a tool that provides for cutting into a surface such as a wall, which may have wires or pipes behind, without inadvertently cutting into the respective wires, pipes, and the like.

BRIEF SUMMARY

According to various embodiments of the present invention, guide blades are disclosed for use with oscillating and reciprocating power tools and provide for protection against the cutting blades protruding outside of a desired area or beyond a specified surface depth. Guide blades are also disclosed that provide for specialized cuts such as, cutting pipes, cutting rectangular stock, cutting pipes along their length, and scrapers for removing linoleum, tile, or wallpaper.

In one embodiment, a guide blade for use with an oscillating power tool includes a blade portion with a cutting edge, an adapter that corresponds to a particular type oscillating power tool, an attachment base for attachment of the guide blade to the oscillating power tool, wherein the attachment base includes an offset portion for attachment of the blade portion to the attachment base, and an accessory attachment portion with an opening for securing the adapter to the attachment base, and a rounded guide affixed to the blade portion between the cutting edge and the offset portion, and the rounded guide extending from side-to-side and curved away from the offset portion and toward the cutting edge, wherein the rounded guide provides for variable cutting depth.

In one embodiment, the offset portion is connected via an angular portion extending from the attachment base to the blade portion so that the attachment base and the blade portion are in different planes.

In another embodiment, another cutting edge of the blade portion extends along one side of the blade portion. In yet another embodiment, the cutting edge is rounded at one end of the cutting edge with curvature extending from cutting edge end to one side of the blade portion.

In another embodiment, the rounded guide has height extending from the plane of the blade portion and toward the plane of the attachment base. In yet another embodiment, a second rounded guide has height extending from the plane of the blade portion opposite the rounded guide and away from the plane corresponding to the attachment base.

In one embodiment, a guide blade for use with an oscillating power tool includes a blade portion with at least one cutting edge, an adapter that corresponds to a particular type oscillating power tool, an attachment base for attachment of the guide blade to the oscillating power tool, the attachment base including an accessory attachment portion with an opening for securing the adapter to the attachment base, an offset portion for attachment of the blade portion to the attachment base, and an angular portion extending from the accessory attachment portion to the offset portion so that the accessory attachment portion and the blade portion are in separate planes, a guide portion affixed to the blade portion between the cutting edge and the offset portion, the guide portion extending from side-to-side of the blade portion and situated between the offset portion and the at least one cutting edge, wherein the guide portion provides for variable cutting depth.

In another embodiment, the guide portion includes a pair of angled sections each extending from a common point toward the attachment base at opposing sides of the blade portion. In another embodiment, angled sections extend from a common point toward the cutting edge at opposing sides of the blade portion. In still another embodiment, the guide portion is a single section extending angularly from one side of the blade portion near the offset portion toward the opposite side of the blade portion and near the cutting edge.

In various embodiments, the guide portion is situated at a distance from the cutting edge that corresponds to a maximum cutting depth.

In another embodiment, the guide portion is u-shaped and extends from the offset portion with outside edges along each edge of the blade portion and extending beyond the blade portion to provide a depth of cut limit for cutting a pipe. In still another embodiment, the guide portion is rectangular-shaped and extending from the offset portion with outside edges along each edge of the blade portion and extending beyond the blade portion to provide a depth of cut limit for cutting a rectangular material.

In one embodiment, the blade portion is a single cutting edge extending in a semi-circular manner at a distance from the accessory attachment portion, and extending away from the blade portion in a curvilinear fashion toward separate planes equidistant from the blade portion in opposite directions, and the guide portion extends in the separate planes beyond the single cutting edge, to provide for cutting linearly along a pipe length.

In another embodiment, a guide blade for use with an oscillating power tool includes a blade portion, an adapter that corresponds to a particular type oscillating power tool, an attachment base to attach the guide blade to the oscillating power tool, and including an accessory attachment portion with an opening for securing the adapter to the attachment base, an offset portion attached to the blade portion, and an angular portion extending from the accessory attachment portion to the offset portion so that the accessory attachment portion and the blade portion are in separate planes, a guide portion affixed to the blade portion between the offset portion and an end of the blade portion, extending from side-to-side of the blade portion and situated between the offset portion and the end of the blade portion opposite the offset portion, to provide for variable blade portion depth of use.

In one embodiment, opposing edges of the blade portion extend from the offset portion with widening distance toward the end of the blade, and the guide portion extends in a curvilinear manner away from the blade portion so that materials scraped or removed by the blade portion are forced away from the blade during use.

In another embodiment, the blade portion includes a pair of groove patterns at an end away from the offset portion and corresponding respectively to the shape of a lip of a can and a lid lip for a corresponding can lid, and further including a container attached to the blade portion for capturing debris cleaned from the can.

Other systems, methods, features and advantages of the present invention will be or become apparent to one with skill in the art upon examination of the following drawings and detailed description. It is intended that all such additional systems, methods, features and advantages be included within this description and be within the scope of the present disclosure.

BRIEF DESCRIPTION OF THE DRAWINGS

The above-mentioned features will become more clearly understood from the following detailed description read together with the accompanying drawings which are not necessarily drawn to scale, and wherein:

FIG. 1-A, FIG. 1-B, and FIG. 1-C are top views of respective prior art oscillating power tool attachment portions;

FIG. 2 is a top view of a prior art blade portion;

FIG. 3 is perspective view of a prior art cutting blade assembly for an oscillating power tool;

FIG. 4-A and FIG. 4-B are opposing views of a prior art mounting adapter;

FIG. 5-A and FIG. 5-B are opposing views of another prior art mounting adapter;

FIG. 6 is an illustration of a notched mounting adapter;

FIG. 7-A is a perspective view of one embodiment of a guide blade for an oscillating power tool;

FIG. 7-B is an exploded perspective view of the guide blade of FIG. 7-A;

FIG. 7-C is a top view of the guide blade of FIG. 7-A;

FIG. 7-D is a side view of the guide blade of FIG. 7-A;

FIG. 16-A is a perspective view of a guide blade for pipes;

FIG. 16-B is a top view of the guide blade for pipes of FIG. 16-A;

FIG. 17-A is a perspective view of a guide blade for rectangular stock;

FIG. 17-B is a top view of the guide blade for rectangular stock of FIG. 17-A;

FIG. 18-A is a top view of a guide blade for scraping;

FIG. 18-B is a side view of the guide blade of FIG. 18-A;

FIG. 19-A is a top view of a guide blade for lengthwise pipe cutting;

FIG. 19-B is a side view of the guide blade for lengthwise pipe cutting; and

DETAILED DESCRIPTION

Figure 8:
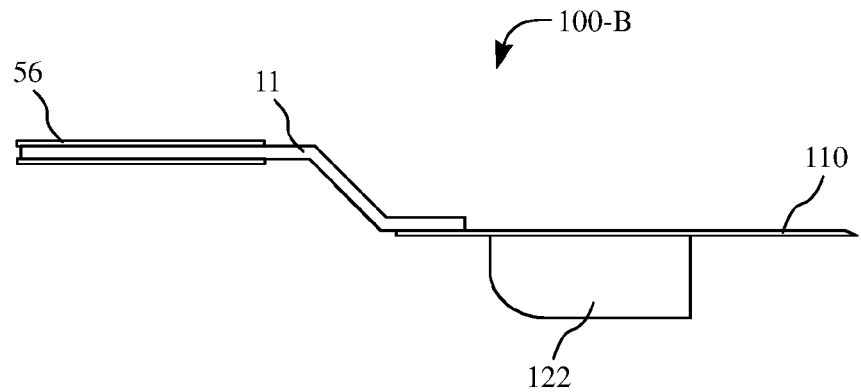
FIG. 8 is a side view of an alternative embodiment of a guide blade for an oscillating power tool.

Blade guides that improve both speed and safety while providing protection against cutting blades protruding outside of a desired area or beyond a specified surface depth are provided for use with large and small oscillating power tools and reciprocating power tools.

Oscillating power tools allow for the use of a range of attachments to saw, sand, rasp, grind, scrape, cut, and/or polish. The fitted blades include an offset that allows for cutting or accessing flush with a surface, or for accessing other difficult to reach locations. Oscillating power tools, also called multi-tools, have a small form and the blades can be mounted in virtually any orientation allowing for cutting in areas that were often previously unreachable. Complex and precise cuts can be made without the need for removing the work piece from where it is located. The resulting increase in productivity and efficiency is significant.

A blade or other accessory is attached to the tool by varying mechanisms that provide for oscillation or rapid rotation back and forth. The back and forth motion creates rapid cutting motions with blade attachments. Since the angle of oscillation is narrow there is no kick as with rotating tools, and the narrow angle provides for precise control of the action taken utilizing the multi-tool.

Oscillating power tools utilize cutting blades that are standard saw blades of various type tooth configurations according to the type material to be cut. Straight blades have the teeth at the end of the blade and allow for cutting directly into the material. Bi-metal blades include smaller hardened teeth for cutting soft metals. Japan tooth blades utilize large teeth for cutting wood quickly, though they cannot cut metal.

Oscillating power tools are handy tools that provide a vast improvement over previous methods of cutting in those situations where specialized cuts are necessary. However, as with any power tool, the oscillating power tool, or multi-tool, is not always an easy tool to steer or control. The guide blades disclosed herein provide for improved steering and control of various type blades that are used with multi-tool type devices.

At least some of the guide blades disclosed herein provide for similar improvements, with slight modifications, for other type power tools such as reciprocating power tools.

Reciprocating power tools perform the cutting action via a push and pull reciprocating motion of the blade. Reciprocating saws are commonly used in construction and demolition work. A reciprocating saw includes a large blade resembling a jigsaw type blade.

It should be noted that many variations in blade types may be used with both oscillating and/or reciprocating saws. Variations in blade type may include a saw tooth type cutting edge, a blade type cutting edge, or a combination of both types. In accordance with the disclosure below, the particular type cutting edge utilized is dependent on the material that the blade is intended to cut. It is within the scope of this disclosure to utilize any type blade and/or blade material in accordance with the particular target cutting material intended.

FIG. 1-A, FIG. 1-B, and FIG. 1-C are top views of some examples of respective prior art oscillating power tool attachment portions 10. FIG. 2 is a top view of a prior art blade portion 20 having a straight cutting edge. FIG. 3 is perspective view of a prior art cutting blade accessory 30 for an oscillating power tool.

A tool attachment portion 10 is affixed with a blade portion 20 to form the blade accessory 30. The tool attachment portion 10 includes an offset so that the blade portion 20 is offset from the attachment point. That is, in an assembled blade accessory 30, the tool attachment portion 10 is offset from the blade portion 20 so that the attachment portion of the tool attachment portion 10 is in a separate plane from the blade portion 20. The plane of the attachment portion of the tool attachment portion 10 is typically parallel to the plane of the blade portion 20. The blade accessory 30 is attached to an oscillating power tool via the tool attachment portion 10. An arbor attachment is utilized for attaching the tool attachment portion 10 to an oscillating power tool. Arbor attachments have varied widely and often utilize a proprietary arbor configuration. Universal arbor attachments have been developed to be compatible with many of these proprietary configurations.

Accessory attachment portions have also been developed so that a separate adapter can be affixed to (welding, for example) form a complete tool attachment portion. Such an accessory attachment portion includes a semi-circle type opening with no adapter present so that an adapter can be welded in place to complete a tool attachment portion.

FIG. 4-A and FIG. 4-B are opposing views of an exemplary Dremel Multi-Max universal mounting adapter 40. The universal mounting adapter 40 allows the owners of various non-Dremel oscillating power tools to use Dremel brand accessories and also allows Multi-Max accessories to be used with oscillating power tools from a variety of other manufacturers. In the illustrated embodiment, the accessory side 42 of the Multi-Mix mounting adapter 40 interfaces with an accessory, and the tool side 44 interfaces with the arbor of the oscillating power tool.

FIG. 5-A and FIG. 5-B are opposing views of an exemplary Bosch Oscillating Interface System (OIS) mounting adapter 50. The Bosch OIS incorporates many tools into a single universal oscillating tool system. Specifically, the OIS adapter 50 is a 12-pin disk that allows Bosch brand accessories to work with oscillating power tools from a variety of other manufacturers. In the illustrated embodiment, the accessory side 52 of the OIS mounting adapter 50 interfaces with an accessory, and the tool side 54 interfaces with the arbor of the oscillating power tool.

It should be noted that both Dremel and Bosch oscillating power tools and accessories are merely examples of the various oscillating power tools and accessories that are available in the marketplace. These and many other companies utilize various adapters to provide for using their oscillating power tool with other accessories, and also for utilizing their accessories with other power tools. Many other manufacturers of oscillating power tools and/or accessories provide for adapters so that many such combinations of accessories and oscillating power tools may be used. It is the intent of this disclosure that all such adapters, oscillating power tools, and/or accessory attachment portions with varying adapters may be adapted for use with the oscillating blade guides disclosed herein.

FIG. 6 is an illustration of a notched mounting adapter 56 for use with an oscillating guide blade as described below. The illustrated notched mounting adapter 56 corresponds to the Bosch OIS adapter shown above. Only the tool side of the notched mounting adapter 56 is shown. It should be understood that the notched mounting adapter 56 shown in FIG. 6 is merely an illustration of one such adapter. The notched mounting adapters 56 are can correspond to any particular combination of oscillating power tools and corresponding accessories.

FIG. 7-A is a perspective view of one embodiment of an oscillating guide blade 100-A for use with an oscillating power tool. FIG. 7-B is an exploded perspective view of the oscillating guide blade 100-A. FIG. 7-C is a top view of the oscillating guide blade 100-A. FIG. 7-D is a side view of the oscillating guide blade 100-A.

The oscillating guide blade 100-A includes a tool attachment base 11, a notched mounting adapter 56, a blade portion 110, and a rounded guide 120. In the illustrated embodiment, the blade portion 110 includes a rounded cutting edge. In an alternative embodiment, the blade portion 110 is straight along the entire width of the cutting edge from one side of the blade portion 110 to the other. That is, the blade portion 210 includes a straight cutting edge extending along the entire width of the blade portion 210. In the illustrated embodiment, the blade portion 110 is made from high carbon-steel, bi-metal, titanium, and/or any other material combinations that are known in the industry for providing oscillating power tool blades.

The notched mounting adapter 56 is affixed to the tool attachment base 11 to form an attachment combination that can fit any particular multi-tool. As illustrated in FIG. 7-B, the tool attachment base 11 includes an opening to which the notched mounting adapter 56 is affixed. Of course, it will be understood by those of skill in the art that any type mounting adapter can be affixed to the tool attachment base 11. The notched mounting adapter 56 or any other type mounting adapter is typically welded to the tool attachment base 11.

It should also be noted that any of the existing and specialized or proprietary tool attachment portions 10 that are known in the art can also be utilized in the guide blade 100-A.

In the illustrated embodiment, the mounting portion or mounting end of the tool attachment base 11 is an open configuration with an open slot. Some mounting ends for the tool attachment portion of various blade configurations include a closed configuration. It should be understood that there are many type configurations for both the mounting configuration of the tool attachment base 11 as well as many type mounting adapters 56 available for use with the various oscillating and/or reciprocating power tools in the marketplace. The various patterns of each are many and varied according to the particular manufacturer and/or other proprietary considerations. The scope of this disclosure is not intended to be limited by such varied and/or proprietary considerations. Any such combination of mounting adapters 56 and tool attachment base 11 portions, whether of a universal type or of a proprietary type, may be utilized with the herein disclosed guide blades.

The rounded guide 120 is affixed to the blade portion 110 near the tool attachment portion 10 and away from the rounded cutting edge of the blade. In the illustrated embodiment, the rounded guide 120 is welded to the blade portion 110. The rounded guide 120 provides for variable distances between the guide and the cutting edge of the blade so that the multi-tool can be positioned for an exact distance for desired cut-depth. In this way, the guide blade 100-A provides for maximum flexibility in the depth of the desired cut, while also providing for stability in control and steering of the multi-tool device.

It should be noted that, and those of skill in the art will recognize that, the particular location of the rounded guide 120 may be any location along the length of the blade portion 110 of the guide blade 100-A to provide a particular range of flexibility in the depth of desired cut. While the illustrated embodiment of the oscillating guide blade 100-A provides a significant degree of flexibility in the type and depth of cut, a guide blade 100-A where the rounded guide 120 is nearer the tool attachment base 11 provides additional depth capability. Similarly locating the guide blade 120 further from the tool attachment base or nearer the cutting edge portion(s) of the blade portion 110, provides for reduced depth of cut and a finer control of the desired cutting depth.

In one embodiment, the guide blade 100-A for use with an oscillating power tool includes a blade portion 110 with a cutting edge, a mounting adapter 56 that corresponds to a particular type oscillating power tool, a tool attachment base 11 for attachment of the guide blade 100-A to the oscillating power tool, wherein the tool attachment base 11 includes an offset portion for attachment of the blade portion 110 to the tool attachment base 11, and an accessory attachment portion with an opening for securing the mounting adapter 56 to the tool attachment base 11, and a rounded guide 120 affixed to the blade portion 110 between the cutting edge and the offset portion, and the rounded guide 120 extending from side-to-side and curved away from the offset portion and toward the cutting edge of the blade portion 110, wherein the rounded guide 120 provides for variable cutting depth.

In one embodiment, the offset portion is an angular portion extending from the tool attachment base 11 to the blade portion 110 so that the tool attachment base 11 and the blade portion 110 are in different planes. In one embodiment, the rounded guide 120 has height extending from the plane of the blade portion 110 and toward the plane of the tool attachment base 11.

In another embodiment, another cutting edge of the blade portion 110 extends along one side of the blade portion 110. In yet another embodiment, the cutting edge is rounded at one end of the cutting edge with curvature extending from cutting edge end to one side of the blade portion 110.

FIG. 8 is a side view of an alternative embodiment of an oscillating guide blade 100-B. The oscillating guide blade 100-B also includes a tool attachment base 11, a blade portion 110, and an alternative rounded guide 122. The alternative rounded guide 122 of the guide blade 100-B is affixed to the opposing side of the blade portion 110, that is away from (in the direction of) the offset and effectively underneath the blade portion 110.

The rounded guide 120 is affixed to the blade portion 110 near the tool attachment base 11 and away from the rounded cutting edge of the blade. In the illustrated embodiment, the rounded guide 120 is welded to the blade portion 110. The rounded guide 120 provides for variable distances between the guide and the cutting edge of the blade portion 110 while also reversing the orientation of the rounded guide to the cutting edge. In this way, the guide blade 100-B provides for maximum flexibility in the depth of the desired cut, while also providing for stability in control and steering of the multi-tool device.

In one embodiment, the rounded guide 120 has height extending from the plane of the blade portion 110 and toward the plane of the tool attachment base 11. In yet another embodiment, a second rounded guide 122 has height extending from the plane of the blade portion 110 opposite the rounded guide 120 and away from the plane corresponding to the tool attachment base 11.

It should be noted that, and those of skill in the art will recognize that, the particular location of the alternative rounded guide 122 may be any location along the length of the blade portion 110 of the guide blade 100-B to provide a particular range of flexibility in the depth of desired cut. While the illustrated embodiment of the oscillating guide blade 100-B provides a significant degree of flexibility in the type and depth of cut, a guide blade 100-B where the rounded guide 122 is nearer the tool attachment base 11 provides additional depth capability. Similarly locating the guide blade 122 further from the tool attachment base or nearer the cutting edge portion(s) of the blade portion 110, provides for reduced depth of cut and a finer control of the desired cutting depth.

Figure 9:
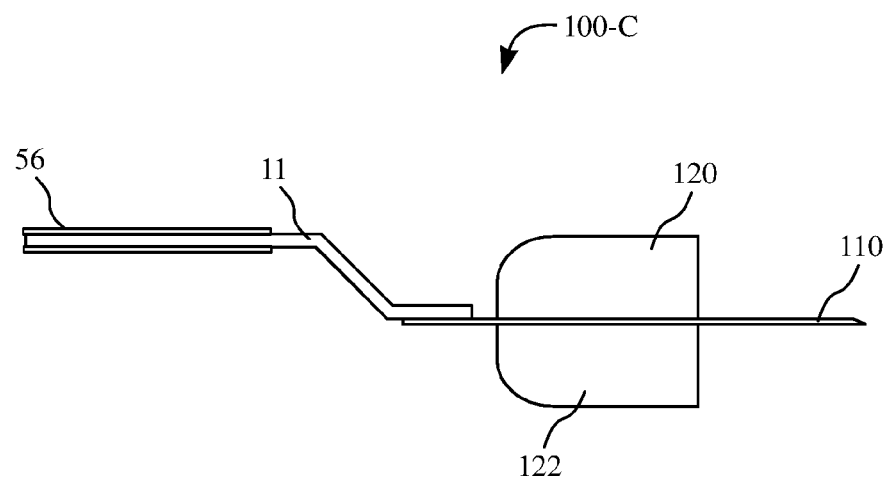
FIG. 9 is a side view of another alternative embodiment of a guide blade.

FIG. 9 is a side view of another alternative embodiment of an oscillating guide blade 100-C. The oscillating guide blade 100-C includes a tool attachment base 11, a blade portion 110, and a rounded guide 120 together with an alternative rounded guide 122. The rounded guide 120 and the alternative rounded guide 122 are affixed opposite each other on either side of the blade portion 110. The rounded guide 120 and the alternative rounded guide are welded to the blade portion 110 opposite each other and toward the tool attachment base 11 of the oscillating guide blade 100-C.

It should be noted that, and those of skill in the art will recognize that, the particular location of the rounded guide 120 and/or the alternative guide 122 may be any location along the length of the blade portion 110 respectively of the guide blade 100-C to provide a particular range of flexibility in the depth of desired cut. While the illustrated embodiment of the oscillating guide blade 100-C provides a significant degree of flexibility in the type and depth of cut, a guide blade 100-C where the rounded guide 120 and/or the alternative guide 122 is nearer the tool attachment base 11 provides additional depth capability. Similarly locating the rounded guide 120 and/or the alternative guide 122 further from the tool attachment base or nearer the cutting edge portion(s) of the blade portion 110, provides for reduced depth of cut and a finer control of the desired cutting depth.

In an alternative embodiment (not shown), the guide blade 100-A, 100-B, and/or 100-C includes a rounded guide 120 and/or the alternative guide 122 that does not extend to the edges of the blade portion 110 on either side along its length. Also, as noted above, the particular location of the rounded guide 120 and/or the alternative guide 122 in the alternative embodiment may be any location along the length of the blade portion 110 of the guide blade 100-A, 100-B, and/or 100-C. It should also be noted that the rounded guide 120 may be affixed opposite the illustrated location, that is, on the underside of the blade portion 110. Together, the reduced width of the rounded guide 120 and/or the alternative guide 122 and the particular position along the length of the blade portion 110, either above or below relative to the offset of the tool attachment base 11, provide for a particular range of flexibility in the depth of desired cut via the blade portion 110.

In such alternative embodiments, the width of the rounded guide may extend as far as the edges of the blade portion 110, or to widths less than that of the blade portion 110 down to one-half the width or even less.

Figure 10:
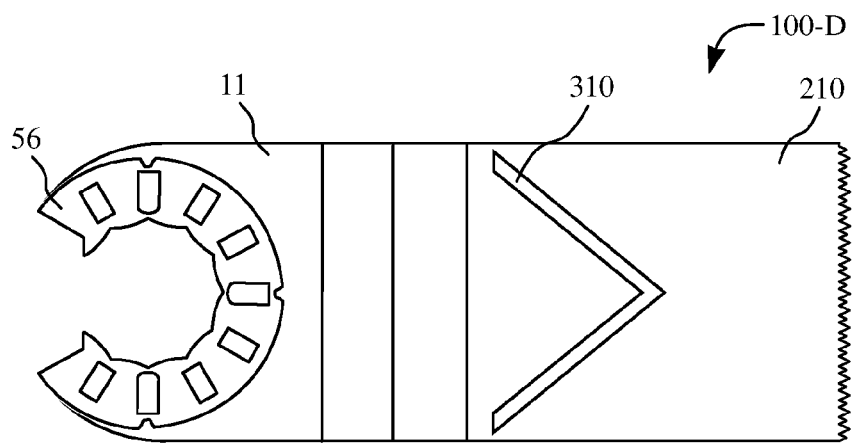
FIG. 10 is a top view of another alternative guide blade.
Figure 11:
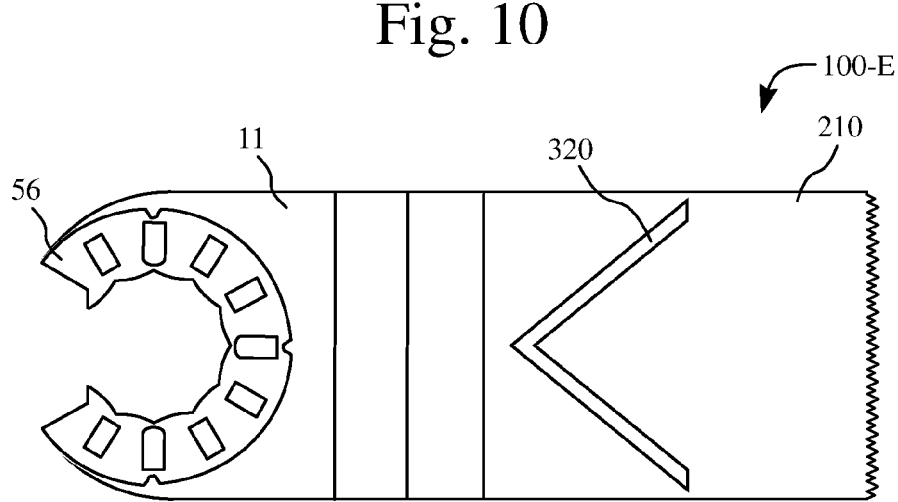
FIG. 11 is a top view of another alternative guide blade.
Figure 12:
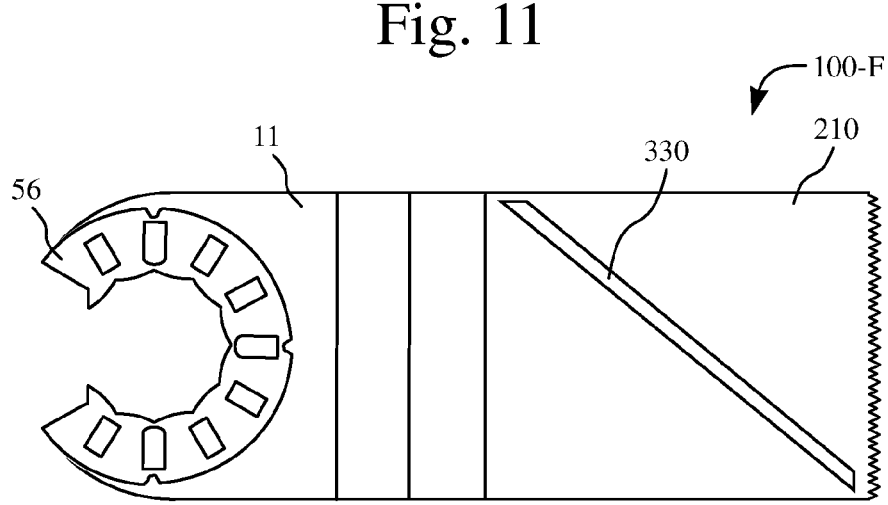
FIG. 12 is a top view of another alternative guide blade.

FIG. 10, FIG. 11, and FIG. 12 illustrate respective top views of further alternative guide blades 100-D, 100-E, and 100-F respectively. The respective embodiments include angled guides extending from one side of the blade portion 210 to the other respectively. The angled guide 310 of FIG. 10 includes a tip that points toward the cutting edge of the blade portion 210. It should be noted that the tip of the angled guide 310 could be closer to the cutting edge than illustrated to provide for different depth of desired cut. It should also be noted that the position of the point or tip of the angle can be at different locations along the width of the blade portion 210 to provide for different angle-influenced depth of cut. Moving the point to either extreme edge of the blade portion results in a single angled guide 330 as in FIG. 12.

FIG. 11 provides a reverse angle guide 320 to limit the radius of a desired cut for the oscillating guide blade 100-E. The angle guide 320 includes a tip that points away from the cutting edge of the blade portion 210. It should be noted that the tip of the angle guide 320 could be closer to the cutting edge than illustrated to provide for different radius and depth of desired cut. It should also be noted that the position of the point or tip of the angle can be at different locations along the width of the blade portion 210 to provide for different angle-influenced radius and depth of cut.

It should be noted, and those of skill in the art will recognize that the particular location of the angle guides 310, 320, 330 may be any location along the length of the blade portion 210 of the guide blades 100-D, 100-E, 100-F respectively. Further, it should also be noted that the angle guides 310, 320, 330 may be affixed opposite the illustrated location, that is, on the underside of the blade portion 210 as viewed in the illustrations of FIG. 10, FIG. 11, and FIG. 12, respectively. Position along the length of the blade portion 210 and/or below the blade portion provide a particular range of flexibility in the depth of desired cut according to the particular location of the respective oscillating guide blades 100-D, 100-E, 100-F.

In one embodiment, a guide blade 100-D, 100-E, or 100-F for use with an oscillating power tool includes a blade portion 210 with at least one cutting edge, a mounting adapter 56 that corresponds to a particular type oscillating power tool, a tool attachment base 11 for attachment of the guide blade 100-D, 100-E, or 100-F to the oscillating power tool, the tool attachment base 11 including an accessory attachment portion with an opening for securing the mounting adapter 56 to the tool attachment base 11, an offset portion for attachment of the blade portion 210 to the tool attachment base 11, and an angular portion extending from the accessory attachment portion to the offset portion so that the accessory attachment portion and the blade portion 210 are in separate planes, a guide portion 310, 320, or 330 affixed to the blade portion 210 between the cutting edge and the offset portion, the guide portion 310, 320, or 330 extending from side-to-side of the blade portion 210 and situated between the offset portion and the at least one cutting edge, wherein the guide portion provides for variable cutting depth.

In another embodiment, the guide portion 310 includes a pair of angled sections extending from a common point toward the attachment base at opposing sides of the blade portion 210. In another embodiment, angled sections 320 extend from a common point toward the cutting edge at opposing sides of the blade portion. In still another embodiment, the guide portion is a single section guide portion 330 extending angularly from one side of the blade portion 210 near the offset portion toward the opposite side of the blade portion and near the cutting edge.

In various embodiments, the guide portion 310, 320, or 330 is situated at a distance from the cutting edge that corresponds to a maximum cutting depth.

Figure 13:
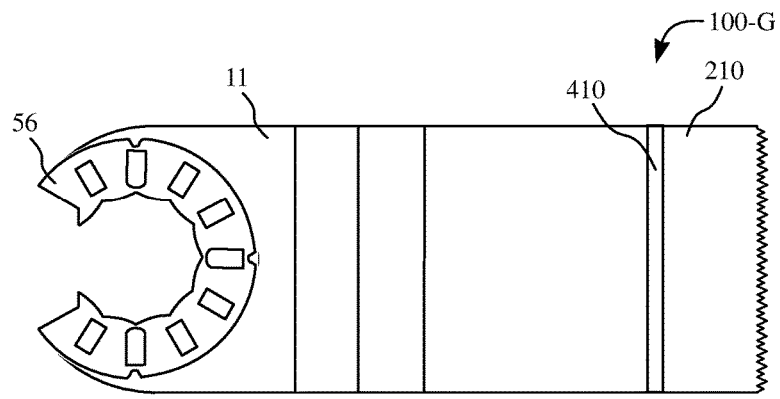
FIG. 13 is a top view of another alternative guide blade.
Figure 14:
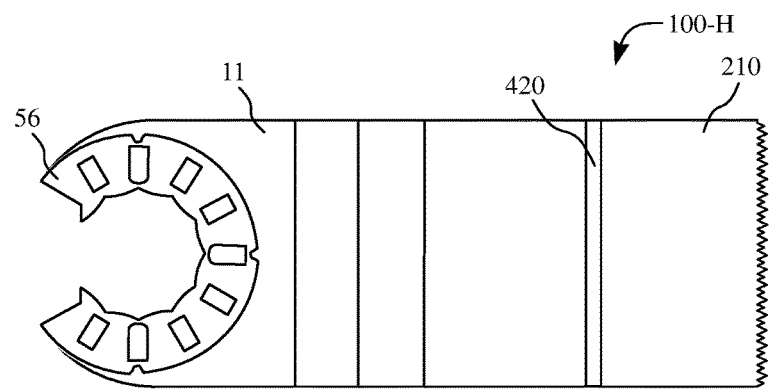
FIG. 14 is a top view of another alternative guide blade.
Figure 15:
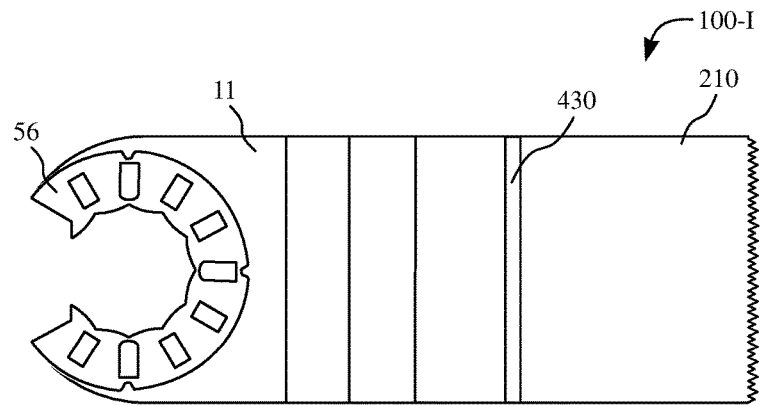
FIG. 15 is a top view of another alternative guide blade.

FIG. 13, FIG. 14, and FIG. 15 illustrate respective top views of further alternative guide blades 100-L, 100-M, and 100-N respectively. Each oscillating guide blade 100-L, 100-M, and 100-N respectively includes a tool attachment base 11, a blade portion 210, and a straight guide 410, 420, 430 respectively. In the illustrated embodiment, the blade portion 210 includes a straight cutting edge extending the entire width of the blade portion 210.

In FIG. 13, the straight guide 410 is affixed to the blade portion 210 near the cutting edge of the blade portion 210 and away from the tool attachment base 11. In the illustrated embodiment, the straight guide 120 is welded to the blade portion 210 and extends substantially the entire width of the blade portion 210. The position of the straight guide 410 provides for a constant distance between the straight guide 410 and the cutting edge of the blade so that the multi-tool can be positioned for a constant and exact distance for a desired cut-depth.

It should be noted that the particular location of a straight guide may be any location along the length of the blade portion 210 to provide a particular constant distance in the depth of desired cut. For example, in FIG. 14, the straight guide 420 is affixed approximately half-way between the tool attachment base 11 and the cutting edge of the blade portion 210. As a further example, in FIG. 15, the straight guide 430 is affixed nearer the tool attachment base 11 and away from the cutting edge of the blade portion 210.

It should be noted, and those of skill in the art will recognize that the particular location of the straight guides 410, 420, 430 may be any location along the length of the blade portion 210 of the guide blades 100-G, 100-H, and 100-I respectively. Further, it should also be noted that the straight guides 410, 420, 430 may be affixed opposite the illustrated location, that is, on the underside of the blade portion 210 as viewed in the illustrations of FIG. 13, FIG. 14, and FIG. 15, respectively. Position along the length of the blade portion 210 and/or below the blade portion provide a particular range of flexibility in the depth of desired cut according to the particular location of the respective oscillating guide blades 100-G, 100-H, and 100-I.

FIG. 16-A is a perspective view of an oscillating guide blade 100-J for cutting pipes. FIG. 16-B is a top view of the guide blade 100-J. The guide blade 100-J includes a tool attachment base 11, a notched mounting adapter 56, a blade portion 210, and a pipe guide 510. In the illustrated embodiment, the blade portion 210 includes a straight cutting edge extending the entire width of the blade portion 210. In the illustrated embodiment, the blade portion 210 is made from high carbon-steel, bi-metal, titanium, and/or any other material combinations that are known in the industry for providing oscillating power tool blades. The guide blade 100-J provides for ease of cutting a single pipe 60 in a location where multiple pipes are vulnerable to an errant cut.

The pipe guide 510 includes a semicircular end portion affixed near the tool attachment base 11 and extending into lengthwise portions that extend along both edges of the blade portion 210. In one embodiment, the lengthwise portions of the pipe guide 510 extend beyond the cutting edge of the blade portion 210 by a length that exceeds the width of the cutting edge. In the illustrated embodiment, the lengthwise portions of the pipe guide 510 extend for a distance approximately 20% greater than the width of the cutting edge of the blade portion 210.

In the illustrated embodiment, the pipe guide 510 is welded to the blade portion 210 along the weld line 512 and near the tool attachment base 11. The pipe guide is not welded along either edge of the blade portion 210. In one embodiment, the width of the cutting edge, and also the pipe guide 510, approximates the diameter of the respective pipe 60 to be cut.

In one embodiment, the guide portion 510 is u-shaped and extends from the offset portion with outside edges along each edge of the blade portion and extending beyond the blade portion 210 to provide a depth of cut limit for cutting a pipe.

FIG. 17-A is a perspective view of an oscillating guide blade 100-K for cutting rectangular stock. FIG. 17-B is a top view of the guide blade 100-K. The guide blade 100-K includes a tool attachment base 11, a notched mounting adapter 56, a blade portion 210, and a rectangular stock guide 520. In the illustrated embodiment, the blade portion 210 includes a straight cutting edge extending the entire width of the blade portion 210. In the illustrated embodiment, the blade portion 210 is made from high carbon-steel, bi-metal, titanium, and/or any other material combinations that are known in the industry for providing oscillating power tool blades. The guide blade 100-K provides for ease of cutting a single piece of stock 70 in a location where multiple pieces are vulnerable to an errant cut.

The stock guide 520 includes a rectangular end portion affixed near the tool attachment base 11 and connecting to lengthwise portions that extend along both edges of the blade portion 210. In one embodiment, the lengthwise portions of the stock guide 520 extend beyond the cutting edge of the blade portion 210 by a length that exceeds the width of the cutting edge. In the illustrated embodiment, the lengthwise portions of the stock guide 520 extend for a distance approximately 20% greater than the width of the cutting edge of the blade portion 210.

In the illustrated embodiment, the stock guide 520 is welded to the blade portion 210 along the weld line 522 and near the tool attachment base 11. The pipe guide is not welded along either edge of the blade portion 210. In one embodiment, the width of the cutting edge, and also the rectangular stock guide 520, approximates the diameter of the respective stock 70 that is to be cut.

In one embodiment, the guide portion 520 is rectangular-shaped and extending from the offset portion with outside edges along each edge of the blade portion 210 and extending beyond the blade portion 210 to provide a depth of cut limit for cutting a rectangular material.

FIG. 18-A is a top view of an oscillating guide blade 100-L for cutting and/or scraping materials. FIG. 18-B is a side view of the guide blade 100-L. The guide blade 100-L includes a tool attachment portion 540, a blade portion 220, and a deflector 550. The tool attachment portion angles out on both sides as it extends away from the arbor and toward the blade portion 220. The blade portion 220 matches the angular direction of the tool attachment portion 540 as the blade portion 220 widens toward a flat scraping edge opposite the tool attachment portion 540.

In an alternative embodiment (not shown), the blade portion 220 of the guide blade 100-L includes a cutting edge rather than a flat edge opposite the tool attachment portion 540.

The deflector 550 extends along the width of the blade portion 220 of guide blade 100-L. The deflector curves up and slightly away from the tool attachment portion 540 of the guide blade 100-L. The oscillating motion of the guide blade 100-L peels materials such as linoleum, wallpaper and such like and the deflector curls the materials up and away from the multi-tool. In this way, the materials are removed without the need for continuously stopping to clean out the mechanism of the multi-tool.

It should be appreciated by those skilled in the art that the scraper guide blade functionality described in regards to FIG. 18-A and FIG. 18-B are also useful for reciprocating power tools such as a recipro saw, a sabre saw, or SAWZALL®, for example. The addition of a deflector to a scraper type blade provides the same functionality of turning the materials away from the reciprocating power tool and reduces or eliminates the need for stopping to clean out the mechanism.

FIG. 19-A is a top view of an oscillating guide blade 100-M for lengthwise pipe cutting. FIG. 19-B is a side view of the guide blade 100-M. The guide blade 100-M includes a tool attachment portion 560, a rounded cutting blade 240, and a lengthwise pipe guide 570a, 570b. The rounded cutting blade 240 includes a cutting edge 242 extending in a circular fashion around the tool attachment portion 560. The lengthwise pipe guide 570a, 570b includes two portions that extend outward from each side of the rounded cutting blade 240 and further extends beyond the cutting edge 242 on each side.

The spacing between the outer edge portions of the lengthwise pipe guide 570a, 570b approximates the diameter of the pipe to be cut. Since the spacing of the lengthwise pipe guide approximates the pipe to be cut, the edge portions of the lengthwise pipe guide 570a, 570b, provide for keeping the rounded cutting blade 240 aligned properly along the length of the pipe.

It should be appreciated by those skilled in the art that the lengthwise pipe-cutting guide blade functionality described in regards to FIG. 19-A and FIG. 19-B are also useful for reciprocating power tools such as a recipro saw, a sabre saw, or SAWZALL®, for example. The addition of a lengthwise pipe guide along both sides of the blade provides the same functionality of keeping the rounded cutting blade 240 aligned properly along the length of the pipe.

In one embodiment, the blade portion 240 includes a single cutting edge 242 extending in a semi-circular manner at a distance from the tool attachment portion 560, and extending away from the blade portion 240 in a curvilinear fashion toward separate planes equidistant from the blade portion 240 in opposite directions, and the guide portion or pipe guide 570a, 570b extends in the separate planes beyond the single cutting edge 242, to provide for cutting linearly along a pipe length.

Figure 20:
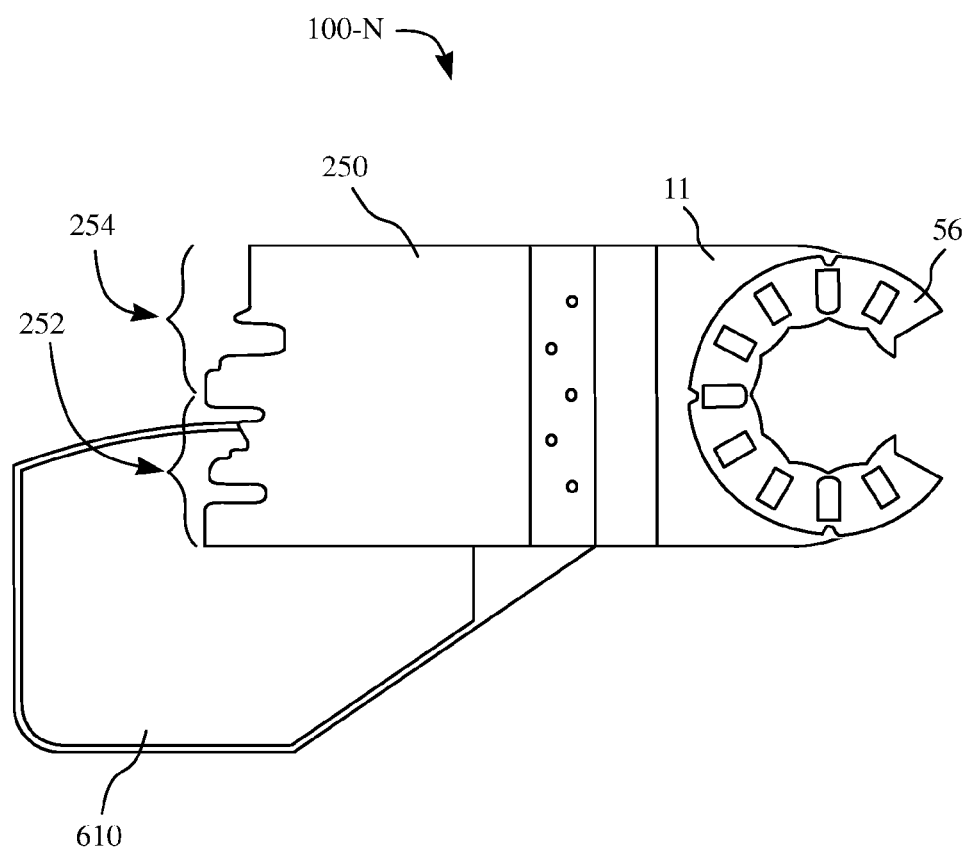
FIG. 20 is a top view of a guide blade for cleaning paint cans and lids.

FIG. 20 is a top view of an oscillating guide blade 100-N for cleaning paint cans and lids. The guide blade 100-N includes a tool attachment base 11, a blade portion 250, and a basin 610. In the illustrated embodiment, the blade portion 210 is made from high carbon-steel, bi-metal, titanium, and/or any other material combinations that are known in the industry for providing oscillating power tool blades. The guide blade 100-N provides for ease of cleaning the paint out of the grooves at the top edge of the paint can and/or the grooves of the lid so that the paint can is effectively sealed to prevent excess air and climatic changes in the environment from deteriorating the paint further. In this way, the paint is preserved for a longer period of time.

The blade portion 250 includes two groove patterns at the end opposite the too attachment base 11. The groove pattern 252 matches the grooves in a typical or standard paint can lid. As such, the blade portion 250 is aligned so that groove pattern 252 mates with the paint can lid, and the oscillation of the multi-tool serves to scrape the paint from the paint can grooves as the groove pattern 252 is moved around the circumference of the top of the paint can.

The basin 610 descends from the blade portion 250 and matches the inner curvature of the paint can. In the illustrated embodiment, the curvature is aligned for a counter-clockwise motion of the blade portion 250 around the top of the paint can. The depth of the basin is sufficient to contain the amount of paint that will be removed from the lid portion, but not so much as to extend into the paint within the can. As the multi-tool operates the oscillating guide blade 100-N, the oscillation removes the paint, and the scraped or removed paint falls into the basin 610. The paint within the can remains clean and the lid is provided with an adequate seal to prevent air from entering the container.

In various embodiments, the basin 610 is made from plastic, canvas, metal, or any other material suitable for receiving the scraped paint from the lid.

The groove pattern 254 does not typically include a basin, though it is within the scope of this disclosure that a second basin (not shown) may be included. The groove pattern 254 is utilized in the same manner so that the oscillating guide blade 100-N, removes paint from the lid. In combination then, a clean paint can top and a clean paint can lid provide for a properly sealed can so that the paint contents may be preserved.

Those skilled in the art will recognize that various oscillating guide blades are provided as guides for use with oscillating power tools (multi-tools) and to provide for cleaner and more precise cuts.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

What is claimed is:

1. A guide blade for use with an oscillating power tool, the guide blade comprising:
   a blade portion with a first cutting edge;
   an adapter that corresponds to a particular type oscillating power tool;
   an attachment base for attachment of the guide blade to the oscillating power tool, the attachment base also including,
      an offset portion for attachment of the blade portion to the attachment base; and
      an accessory attachment portion having an opening for securing the adapter to the attachment base; and
   a rounded guide affixed to one surface of the blade portion, the one surface extending between a first edge and a second edge of the blade portion, the first edge and the second edge being parallel each other and extending between the offset portion and the first cutting edge, the rounded guide situated between the first cutting edge and the offset portion, the rounded guide further being semi-circular with a concavity opening toward the offset portion and extending between the first edge and the second edge of the blade portion
   wherein the rounded guide provides for variable cutting depth.

2. The guide blade of claim 1, further comprising an angular portion extending between the accessory attachment portion and the offset portion, so that the accessory attachment portion and the blade portion are in different planes.

3. The guide blade of claim 2, wherein the first cutting edge extends curvilinearly from an end corner of the blade portion opposite the offset portion, the end corner adjoining a second edge of the blade portion extending from the offset portion, the first cutting edge having curvature extending from the end corner back toward the offset portion, and adjoining a first edge of the blade portion opposite the second edge of the blade portion.

4. The guide blade of claim 3, further comprising a second cutting edge along the second edge of the blade portion.

5. The guide blade of claim 2, wherein the rounded guide has a height extending from a first plane of the blade portion and toward a second plane corresponding to the attachment base.

6. The guide blade of claim 2, wherein the rounded guide has a height extending from a first plane of the blade portion and away from a second plane corresponding to the attachment base.

7. The guide blade of claim 5, wherein a second rounded guide has a second height extending from the plane of the blade portion opposite the rounded guide and away from the plane corresponding to the attachment base.

8. A guide blade for use with an oscillating power tool, the guide blade comprising:
   a blade portion with at least one cutting edge;
   an adapter that corresponds to a particular type oscillating power tool;
   an attachment base for attachment of the guide blade to the oscillating power tool, the attachment base including:
      an accessory attachment portion, the accessory attachment portion having an opening for securing the adapter to the attachment base;
      an offset portion, wherein the blade portion is attached to the offset portion; and an angular portion extending between the accessory attachment portion and the offset portion, so that the accessory attachment portion and the blade portion are in separate planes;

a guide portion affixed to one surface of the blade portion, the one surface extending between opposing edges of the blade portion, the opposing edges being parallel each other and extending from the offset portion past the guide portion, the guide portion situated between the opposing edges, the guide portion further being semi-circular with a concavity opening toward the offset portion, wherein the guide portion provides for variable cutting depth.

9. The guide blade of claim 8, further comprising that the guide portion affixed to the blade portion has a height extending from a first plane of the blade portion and toward a second plane corresponding to the attachment base.

10. The guide blade of claim 9, further comprising that the guide portion is a rounded guide affixed to the blade portion between the cutting edge and the offset portion, the rounded guide further being semi-circular and extending from side-to-side of the blade portion and curved away from the offset portion and toward the cutting edge.

11. The guide blade of claim 9, further comprising that the guide portion affixed to the blade portion includes a pair of angled sections each extending from a common point toward the attachment base at opposing edges of the blade portion.

12. The guide blade of claim 9, further comprising that the guide portion affixed to the blade portion includes a pair of angled sections each extending from a common point toward the cutting edge at opposing edges of the blade portion.

13. The guide blade of claim 9, further comprising that the guide portion affixed to the blade portion is a single section extending angularly from one side of the blade portion near the offset portion toward an opposite side of the blade portion and near the at least one cutting edge.

14. The guide blade of claim 9, wherein the guide portion is situated at a distance from the at least one cutting edge, the distance corresponding to a maximum cutting depth.

15. The guide blade of claim 8, further comprising that the guide portion is u-shaped and extending from the offset portion with outside edges along each edge of the blade portion, the outside edges extending beyond the blade portion, wherein the guide portion provides for a depth of cut limit for cutting a pipe.

16. The guide blade of claim 8, further comprising that the guide portion is rectangular-shaped at and extending from the offset portion with outside edges along each edge of the blade portion, the outside edges extending beyond the blade portion, wherein the guide portion provides for a depth of cut limit for cutting a rectangular material.

17. The guide blade of claim 8, further comprising that the blade portion is a single cutting edge extending in a semi-circular manner at a distance from the accessory attachment portion, the guide portion extending away from the blade portion in a curvilinear fashion toward separate planes equidistant from the blade portion in opposite directions, so that the guide portion extends in the separate planes beyond the single cutting edge, to provide for cutting linearly along a pipe length.

18. A guide blade for use with an oscillating power tool, the guide blade comprising:
   a blade portion;
   an adapter that corresponds to a particular type oscillating power tool;
   an attachment base for attachment of the guide blade to the oscillating power tool, the attachment base including:
      an accessory attachment portion, the accessory attachment portion having an opening for securing the adapter to the attachment base;
      an offset portion, wherein the blade portion is attached to the offset portion; and
      an angular portion extending between the accessory attachment portion and the offset portion, so that the accessory attachment portion and the blade portion are in separate planes;
   a guide portion affixed to one surface of the blade portion between the offset portion and an end of the blade portion, the one surface extending between a first edge and a second edge of the blade portion, the first edge and the second edge being parallel each other and extending between the offset portion and the end of the blade portion, the guide portion further being semi-circular with a concave opening toward the offset portion and extending between the first edge and the second edge of the blade portion,
   wherein the guide portion provides for variable blade portion depth of use.

19. The guide blade of claim 18, further comprising that opposing edges of the blade portion extend from the offset portion with widening distance toward the end of the blade, and the guide portion extending in a curvilinear manner away from the blade portion toward the accessory attachment portion plane, so that materials scraped or removed by the blade portion are forced away from the blade during use.

20. The guide blade of claim 18, further comprising that the blade portion includes a pair of groove patterns at an end away from the offset portion, the groove patterns corresponding respectively to the shape of a lip of a can and a lid lip for a corresponding can lid, the guide blade further including a container attached to the blade portion, the container for capturing debris cleaned from the can.

* * * * *